Nov. 12, 1940.  L. W. WATERS  2,221,336
MOTOR AND TRANSMISSION FOR WINDSHIELD WIPERS
Filed Nov. 6, 1939
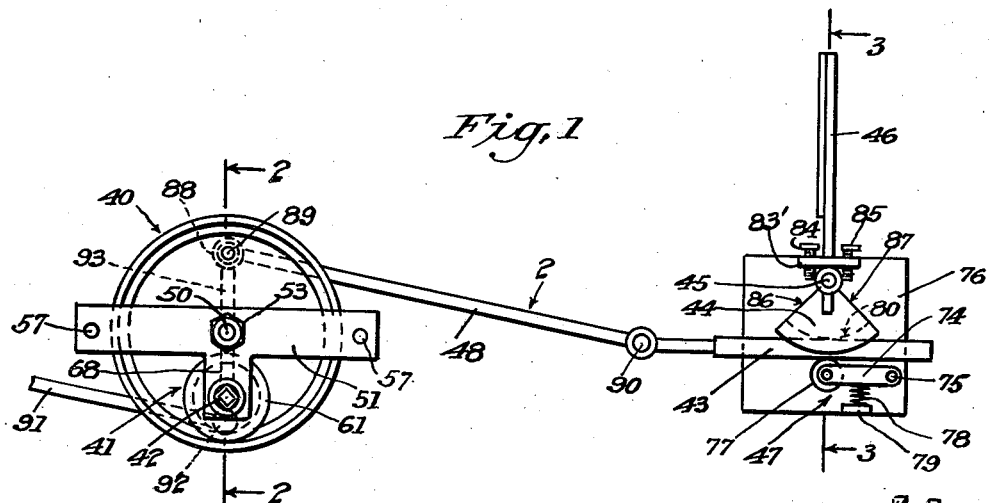
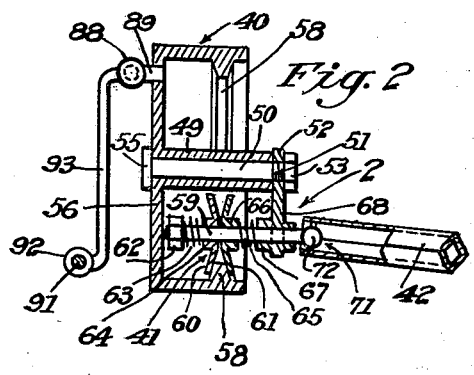
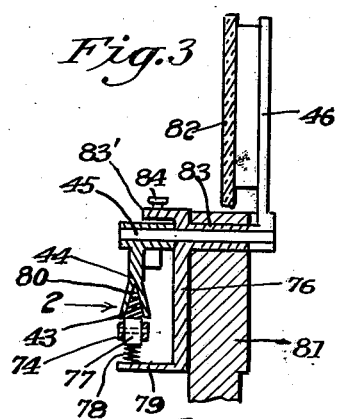
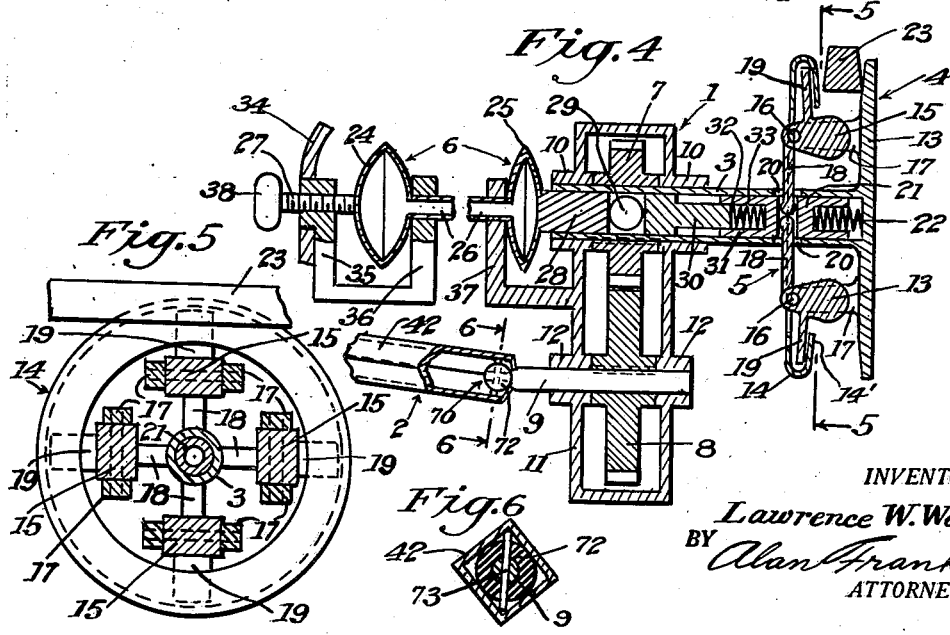
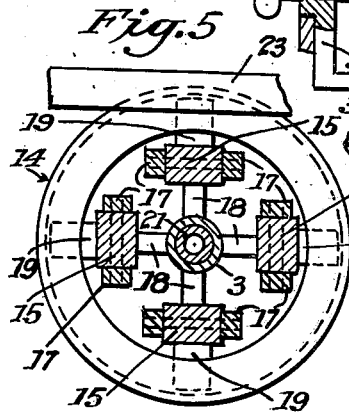
INVENTOR:
Lawrence W. Waters,
BY Alan Franklin
ATTORNEY.

Patented Nov. 12, 1940

2,221,336

UNITED STATES PATENT OFFICE 2,221,336

MOTOR AND TRANSMISSION FOR WINDSHIELD WIPERS

Lawrence W. Waters, Los Angeles, Calif.

Application November 6, 1939, Serial No. 303,082

2 Claims. (Cl. 74—230.17)

This invention relates to motors and transmission for driving windshield wipers of motor vehicles.

One of the objects of the invention is to provide an improved and efficient mechanical motor for driving motor vehicle windshield wipers.

Another object is to provide an improved motor transmission for motor vehicle windshield wipers.

Other objects and advantages will appear hereinafter.

The invention is illustrated in the annexed drawing which forms a part of this specification and in which, Fig. 1 is a front view of my motor transmission applied to a motor vehicle windshield wiper.

Fig. 2 is a longitudinal vertical section of my motor transmission taken on line 2—2 of Fig. 1.

Fig. 3 is a vertical section of my motor transmission taken on line 3—3 of Fig. 1.

Fig. 4 is a longitudinal section of my motor for driving motor vehicle windshield wipers.

Fig. 5 in a transverse section of the drive pulley and governor of my motor, taken on line 5—5 of Fig. 4.

Fig. 6 is a cross section of one of the connecting joints of the transmission shaft taken on line 6—6 of Fig. 4.

Referring more particularly to the drawing, in which corresponding parts are designated by the same reference numerals in all of the views, 1 designates generally my motor and 2 my motor transmission for motor vehicle windshield wipers.

The motor 1 includes a hollow drive shaft 3, a drive pulley 4 secured on the outer end of said drive shaft, a speed governor 5 mounted on said pulley, a hydraulic control 6 for said governor, a pinion 7 secured on said drive shaft 3, a gear 8 in mesh with said pinion and a driven shaft 9 on which said gear 8 is secured. The drive shaft 3 is journaled in a pair of bearings 10 in the front and rear walls respectively of a casing 11, which casing encloses the pinion 7 and gear 8 and is also formed with a pair of bearings 12 in its side walls respectively, in which bearings is journaled the driven shaft 9. The casing 11 is suitably mounted on the forward end of the engine of an automobile, with the pulley 4 in position to receive the belt of the radiator fan of the automobile. The pulley 4 comprises a disk 13, secured on the end of the drive shaft 3, and an internal channel-shaped annulus 14, movably mounted on the governor 5, said disk forming a fixed side of said pulley and said annulus forming a movable side of said pulley, in the manner hereinafter more particularly and fully described. The governor 5 includes a plurality of weights 15, each of which is pivotally mounted on a pivot pin 16, between a pair of arms 17 extending inwardly from the pulley disc 13, which pivot pin is secured at its ends in the inner ends respectively of said arms, and each of said weights 15 is formed with an inwardly-extending arm 18 and an outwardly-extending arm 19, said arm 18 extending into the hollow shaft 3 through a slot 20 in said shaft, and said arm 19 extending into the internal channel-shaped pulley annulus 14. A spring plunger 21 is slidably mounted in the outer end of the hollow drive shaft 3 between the pulley disc 13 and the inner ends of the weight arms 18, and a spring 22 is interposed in said drive shaft between said pulley disc and said plunger, which spring urges said plunger against the inner ends of said weight arms 18 and swings said arms, weights 15 and weight arms 19 counterclockwise (Fig. 4), whereby said weight arms 19 are caused to engage the inner wall of the pulley channel annulus 14 and move said annulus toward the fixed pulley disc 13, until the fan belt 23 of the engine of an automobile is gripped between said inner wall of said pulley annulus and the inner side of said pulley disc, so that said fan belt will rotate the pulley 4, when said engine is running. The hydraulic control 6 comprises a pair of hollow expansible and contractible diaphragms 24 and 25, a tube 26 connecting said diaphragms, a thumb screw 27 for engaging the rear wall of said diaphragm 24, a stem 28 extending forwardly from the forward wall of said diaphragm 25 into the rear end of the hollow drive shaft 3, an end thrust ball bearing 29 in said drive shaft forwardly of the forward end of said stem 28, a male plunger 30 slidable in said hollow drive shaft 3 forwardly of said ball bearing 29, a female plunger 31 slidable in said hollow drive shaft and formed with a bore 32 to receive the forward end portion of said male plunger 30, and a spring 33 in said female plunger bore 33, bearing at one end against the inner end of said bore and at its other end against the forward end of said male plunger 30. The thumb screw 27 extends through the instrument panel 34 of the automobile and is threaded in a bracket 35 secured to the back of said instrument panel, and the rear end of the tube 26 is secured in an arm 36 of said bracket with the forward wall of the diaphragm 24 against the rear side of said arm. The forward end of the tube 26 is secured in an arm 37 extending from the rear wall of the gear casing 11 with the rear wall of the diaphragm 25 against the forward side of said arm. A knob 38 is formed on the rear end of the thumb screw 37 to be gripped by one's thumb and fingers for turning said screw.

The motor transmission 2 includes a crank wheel 40, a friction clutch 41 for clutching said crank drum, a transmission shaft 42 connected at one end to said clutch and at its other end to the motor driven shaft 9, a slide bar 43, a grooved segment 44 secured on the inner end of the fulcrum shaft 45 of a windshield wiper 46, a friction clutch 47 for clutching said slide bar to said segment, and a pitman 48 connected at one end to said slide bar and at its other end to said crank drum 40.

The hub 49 of the crank drum 40 is journaled on a stud shaft 50, one end of which is threaded at 51 and extends through and is screw seated in a supporting bar 52, there being a lock nut 53, which engages said thread 51 and clamps against the outer side of said supporting bar. The other end of said journal 50 is formed with a head 55 which engages the end wall 56 of the crank drum 40 to prevent said drum from sliding off said end of said journal. The supporting bar 51 is provided with screw openings 57 in its ends to receive screws for securing said bar in a suitable position on a part of the automobile near the windshield. Crank drum 40 is formed with an internal V-shaped annulus 58 engaged by the friction clutch 41. Said clutch comprises a clutch shaft 59, a pair of frusto-conical discs 60 and 61 slidable on said shaft, at opposite sides of the crank drum annulus 58, a nut 62 threaded on the inner end of said clutch shaft, a coil spring 63 surrounding said clutch shaft between said nut 62 and the hub 64 of the clutch disc 60, a coil spring 65 surrounding said clutch shaft between the hub 66 of the clutch disc 61 and a bearing 67 on an arm 68 depending from the supporting bar 51, in which bearing the outer end portion of said clutch shaft is journaled and through which bearing said end portion of said shaft extends. The spring 63, compressed between the nut 62 and the hub 64 of the clutch disc 60 and the spring 65 compressed between the bearing 67 and the hub 66 of clutch disc 61, cause said discs to clutch therebetween the annulus 58 of the crank drum 40, so that upon rotation of the clutch shaft 59 said clutch discs will be rotated in sufficient frictional contact with opposite sides of said annulus to rotate said crank drum.

The transmission shaft 42 is a square tube and its ends are fitted on and connected by flexible ball joints 70 and 71, respectively, to the outer end of the motor driven shaft 9 and the outer end of the clutch shaft 59. Each of said joints 70 and 71 comprises a rubber ball 72 and a pin 73. The pin 73 of the joint 70 extends through the ball 72 of said joint and through the outer reduced end of the motor driven shaft 9, to hold said ball on said shaft, and the ends of said pin extend beyond the surface of said ball into opposite corners of the rear end of the square tubular transmission shaft 42, while the walls of said tubular shaft contact the surface of said ball. The pin 73 of the joint 71 extends through the ball 72 of said joint and through the reduced outer end of the clutch shaft 59, to hold said ball on said shaft, and the ends of said pin extend beyond the surface of said ball into opposite corners of the square tubular transmission shaft 42, while the walls of said shaft contact the surface of said ball.

The friction clutch 47 for the slide bar 43 comprises a clutch arm 74 pivoted at one end at 75 on a supporting plate 76, a roller 77 journaled on the other end of said arm and a spring 78, resting at its lower end upon an arm 79 outstanding from said plate and engaging at its upper end the under side of said clutch arm 74 for swinging said clutch arm upwardly, so that its roller 77 will engage the lower side of the slide bar 43 and hold said slide bar in a V-shaped groove 80 in the lower edge of the segment 44 in contact with the sides of said groove with sufficient friction to cause said bar, when reciprocated, to oscillate said segment, windshield wiper shaft 45 and windshield wiper 46.

The supporting plate 76 is secured to the inner side of the dash 81 below the windshield 82 of an automobile, and said plate is formed with a bearing 83, projecting forwardly through the upper part of said dash, in which bearing is journaled the fulcrum shaft 45, on the forward end of which shaft, forwardly of said dash, is secured, at its lower end, the windshield wiper 46, in position for wiping the front or outer surface of the windshield 82. In a flange 83', projecting inwardly from the upper edge of the supporting plate 76, are threaded a pair of set screws 84 and 85, for engaging the opposite radial edges 86 and 87, respectively, of the segment 44, for adjustably limiting the oscillating movement of the windshield wiper 46.

The pitman 48 is swivelly connected at one end, by a swivel ball joint 88, to crank pin 89 secured to the rear wall 56 of the crank drum 40, and at its other end, at 90, to one end of the slide bar 43, so that said pitman, upon rotation of said crank drum, will reciprocate the slide bar 43 to oscillate the segment 44 and the windshield wiper 46. Another pitman 91 may be swivelly connected at one end, by a swivel ball joint 92 to a crank 93 extending from the outer end of the crank pin 89 for actuating another windshield wiper (not shown) in front of an occupant of the front seat of an automobile at the right of the driver of the automobile.

The operation of my invention is as follows:

The diaphragms 24 and 25 and the tube 26 being filled with liquid, the thumb screw 27 is turned in one direction to cause its forward end to engage the rear side of the diaphragm 24 and contract said diaphragm to force sufficient liquid therefrom, through said tube 26 into the diaphragm 25 to expand said diaphragm, so that it will project the stud 28, ball bearing 29, male plunger 30 and female plunger 31, through spring 33, forwardly, to cause said female plunger to engage the inner ends of the weight arms 18 and swing said arms, weights 15, and weight arms 19 on the pivots 16 against the resistance of the spring plunger 21, until said weight arms 19 engage the outer wall of the channel annulus 14 and move said annulus inwardly until its inner wall releases the fan belt 23 to allow said belt to travel through the pulley 5 without rotating said pulley and driving the motor 1, while the engine of the automobile runs and it is not desired to operate the windshield wiper.

When it is desired to operate the windshield wiper 46, the thumb screw 27 is turned in the reverse direction and withdrawn rearwardly to allow the diaphragm 24 to expand rearwardly, whereupon the spring plunger 21 engages the inner ends of the weight arms 18 and swings said arms, weights 15 and weight arms 19 on the pivots 16, so that said arms 19 engage the inner channel wall 14' of the annulus 14 and move said annulus inwardly until its said channel wall engages the adjacent side of the fan belt 23 and grips said belt between the annulus and the fixed pulley disc 13, during which gripping operation of said annulus the plunger 31 is engaged by the inner ends of the weight arms 18, under the influence of the spring plunger 21, and said plunger 31, plunger 30, ball bearing 29 and stud 28 are moved rearwardly and the diaphragm 25 is contracted, which forces liquid therefrom through the tube 26 into the diaphragm 24 which diaphragm is allowed to expand by the withdrawn screw 27 to receive said additional liquid.

The fan belt 23, gripped by the pulley 5, rotates said pulley, which rotates the drive shaft 3 and pinion 7, and said pinion rotates the gear 8 and driven shaft 9, whereupon the clutch 41, through the medium of transmission shaft 42, is rotated, and said clutch, engaging the crank drum annulus 58, rotates the crank drum 40, which drum, through the pitman 48, reciprocates the slide bar 43 and said slide bar, engaging the grooved segment 44, under the influence of the friction clutch 41, oscillates the windshield wiper 46. The friction clutches 41 and 47 permit slippage of the crank drum 40 and the slide bar 43 when any unusual resistance is offered by the windshield wiper 46.

Should the motor 1 be driven above a predetermined speed the weights 15 will be swung outwardly on their pivots 16 by centrifugal force and the weight arms 19, engaging the outer wall of the channel annulus 14, will move said annulus away from the fan belt 23 and release said belt, whereupon the speed of the motor running on momentum will decrease to its predetermined speed and the weights 15 will swing inwardly and cause their arms 19 to engage the inner wall of said annulus 14 and move said annulus inwardly until the belt 23 is again gripped between said annulus and the fixed wall 13 of the pulley 5 and said pulley is again rotated and the motor 1 driven as aforesaid.

I claim:

1. A motor as disclosed, comprising a hollow drive shaft, a drive pulley mounted on said drive shaft, said drive pulley comprising a disc fixed on said drive shaft and an internal channel-shaped annulus movable toward or away from said disc, a governor comprising a plurality of weights pivotally mounted on said disc and formed with outer arms extending into the channel of said annulus and with inner arms extending into said hollow drive shaft, and a spring plunger in said hollow shaft engaging said inner arms for swinging said arms, weights and said outer arms on the pivots of said weights to cause said outer arms to engage and move said annulus toward said disc to grip a belt between said disc and said annulus, while said pulley is driven by said belt below a predetermined speed, said weights being arranged to be swung outwardly by centrifugal force to cause said outer arms to engage and swing said annulus away from said belt to release said belt when said pulley is rotated above said predetermined degree, means extending into said hollow shaft for engaging said inner weight arms to hold said annulus out of engagement with said belt to release said belt to prevent rotation of said pulley, and means actuated by said drive shaft for applying the power of the motor.

2. A motor as disclosed comprising a hollow drive shaft, a drive pulley mounted on said drive shaft, said drive pulley comprising a disc fixed on said drive shaft and an internal channel-shaped annulus movable toward or away from said disc, a governor comprising a plurality of weights pivotally mounted on said disc and formed with outer arms extending into the channel of said annulus and with inner arms extending into said hollow drive shaft, and a spring plunger in said hollow shaft engaging said inner arms for swinging said arms, weights and said outer arms on the pivots of said weights to cause said outer arms to engage and move said annulus toward said disc to grip a belt between said disc and said annulus, while said pulley is driven by said belt below a predetermined speed, said weights being arranged to be swung outwardly by centrifugal force to cause said outer arms to engage and swing said annulus away from said belt to release said belt when said pulley is rotated above said predetermined degree, a rear hollow diaphragm mounted to expand rearwardly, a forward hollow diaphragm mounted to expand forwardly and a tube connecting said diaphragm, a stud extending from said forward diaphragm into said hollow drive shaft, a ball bearing in said shaft engaged by the forward end of said stud, a male plunger slidable in said shaft and engaged at its rear end by said ball bearing, a female plunger slidable in said shaft to receive the forward end of said male plunger, a spring in said female plunger to resist forward movement of said male plunger into said female plunger, a set screw mounted to engage the rear wall of said rear diaphragm to contract said diaphragm to force liquid therefrom through said tube into said forward diaphragm to expand said forward diaphragm to force said stud, ball bearing, male plunger and said female plunger, through its spring, forwardly to cause said female plunger to engage said inner weight arms to hold said annulus away from said belt to release said belt to prevent rotation of said pulley, and means actuated by said drive shaft to apply the power of the motor.

LAWRENCE W. WATERS.